United States Patent [19]

Jabs et al.

[11] 4,051,081

[45] * Sept. 27, 1977

[54] PROCESS FOR MAKING HYDROPHILIC POLYURETHANE FOAMS

[75] Inventors: Gert Jabs, Schildgen; Gunther Loew, Leichlingen, both of Germany

[73] Assignee: Bayer Aktiengesellschaft, Leverkusen, Germany

[ * ] Notice: The portion of the term of this patent subsequent to Mar. 25, 1992, has been disclaimed.

[21] Appl. No.: 705,648

[22] Filed: July 15, 1976

Related U.S. Application Data

[63] Continuation-in-part of Ser. No. 449,296, March 8, 1974, abandoned.

[30] Foreign Application Priority Data

Mar. 14, 1973 Germany .............................. 2312678

[51] Int. Cl.² ............................................. C08G 18/14
[52] U.S. Cl. ...................... 260/2.5 AD; 260/2.5 AG; 264/45.1
[58] Field of Search .................. 260/2.5 AD, 2.5 AG

[56] References Cited

U.S. PATENT DOCUMENTS

| | | | |
|---|---|---|---|
| 2,894,919 | 7/1959 | Simon et al. | 260/2.5 |
| 2,938,005 | 5/1960 | Bick et al. | 260/2.5 |
| 3,002,937 | 10/1961 | Parker et al. | 260/2.5 |
| 3,594,334 | 7/1971 | Marlin | 260/2.5 |
| 3,793,268 | 2/1974 | Dietrich et al. | 260/2.5 |
| 3,799,898 | 3/1974 | Lamplugh et al. | 260/2.5 AD |
| 3,873,476 | 3/1975 | Jabs et al. | 260/2.5 AD |
| 3,890,254 | 6/1975 | Guthrie | 260/2.5 AG |

FOREIGN PATENT DOCUMENTS

| | | | |
|---|---|---|---|
| 1,043,572 | 9/1966 | United Kingdom | 260/2.5 |
| 887,724 | 1/1962 | United Kingdom | 260/2.5 |

*Primary Examiner*—Eugene C. Rzucidlo
*Attorney, Agent, or Firm*—Gene Harsh; Joseph C. Gil; William E. Parry

[57] ABSTRACT

A process for making a hydrophilic polyurethane foam suitable for sponges and wiping cloths which comprises reacting an organic polyisocyanate and an organic compound having reactive hydrogen atoms in a mixture containing a blowing agent and an alkyl aryl sulphonic acid.

6 Claims, No Drawings

PROCESS FOR MAKING HYDROPHILIC POLYURETHANE FOAMS

This is a continuation-in-part of our co-pending application Ser. No. 449,296 filed Mar. 8, 1974, now abandoned.

This invention relates generally to polyurethane foams and, more particularly, to a process for making hydrophilic polyurethane foams.

processes for rendering soft eleastic polyurethane foams hydrophilic are already know. They can be divided into two groups depending upon the procedure employed.

In the first group, a polyurethane foam which has already been formed is after-treated by chemical or physical means to render it more open-celled or to modify the foam structure so that it can be wetted with water.

The second group includes processes in which the hydrophilic character of the foams in increased by adding suitable fillers to the reaction mixture and/or by using polyhydroxyl polyethers with a high ethylene oxide content (e.g. the process disclosed in German Offenlegungsschrift No. 2,127,040). It has also been proposed to render foams hydrophilic by adding certain additives to the reaction mixture (e.g. process according to German Offenlegungsschrift Nos. 1,694,027 and 1,694,028).

One of the disadvantages of the process which involves after-treatment of foams lies in the high cost of this subsequent modification so these methods are not of commercial interest because of economical reasons.

The foams obtained by the second group of processes, on the other hand, swell in water and are therefore inferior in quality, especially in tensile strength and elongation at break. The same loss in quality is also observed to take place when fillers are added, whereas foams which have been rendered hydrophilic by means of additives in accordance with the known art are not capable of absorbing water from a wet surface.

It is therefore an object of this invention to provide a process for making hydrophilic, polyurethane foams which are devoid of the foregoing disadvantages. Another object of the invention is to provide a process for making a polyurethane foam hydrophilic without adversely affecting its physical properties such as tensile strength and elongation. Still another object of the invention is to provide soft elastic polyurethane foams which are hydrophilic and have not suffered any significant loss in other physical properties and have excellent water absorbency.

The foregoing objects and others are accomplished in accordance with this invention, generally speaking, by providing a process for the production of hydrophilic polyurethane foams from organic polyisocyanates, organic compounds which contain at least two active hydrogen atoms, determinable by the Zerewitinoff method, water and optionally other additives wherein an alkyl aryl sulphonic acid which is soluble in the organic polyhydroxyl compound is included in the reaction mixture in a quantity of from about 0.5% to about 20% by weight, preferably about 2% to about 10% by weight, based on the weight of polyhydroxyl compound used, to render the reaction mixture hydrophilic. The reaction mixture may contain other surface-active additives in combination with the alkyl aryl sulphonic acid. It is particularly preferred to prepare soft, elastic, hydrophilic polyurethane foams. It is also preferred to prepare rigid foams by the process of the present invention.

It has been found surprisingly that polyurethane foams with good wetting properties can be obtained if alkyl aryl sulphonic acids which are soluble in the polyhydroxyl compounds used are mixed with the usual starting materials comprising polyhydroxyl compounds, polyisocyanates, water and other additives. These alkyl aryl sulphonic acids render the reaction products hydrophilic.

The high water absorbency of the foams obtained according to the invention makes these foams eminently suitable for use as sponges or as wiping cloths either in a compressed or uncompressed form The invention therefore also provides a process for making compressed or uncompressed webs of foams for use as sponges and wiping cloths.

When producing the foams according to the invention, any suitable alkyl aryl sulphonic acid may be used, but it is preferred to use one of the general formula $(R)_n-Ar-(-SO_3H)_m$ in which Ar represents a $C_6-C_{14}$ arylene group preferably phenylene, naphthylene or diphenylene and R represents an alkylene group fo 2–20 carbon atoms; $n$ represents an integer of from 1 to 4 and $m$ represents an integer of from 1 to 3.

The total number of the carbon atoms present in alkylene groups should be 4 to 40 carbon atoms, (preferably 6–30 carbon atoms). The number of alkylene groups is 1–4 preferably 1 to 2. The arylene groups are preferably phenylene groups although naphthylene and/or diphenylene groups and higher condensed arylene groups and/or polyarylene groups may also be used.

The preparation of alkyl aryl sulphonic acid is already known and may be carried out, for example, by sulphonating the aromatic group, for example with fuming sulphuric acid. It is preferred to use sulphonic acids which contain one equivalent or sulphonic acid groups per alkyl aryl group although disulphonic and/or trisulphonic acids may also be used. Examples of the sulphonic acids mentioned above and their salts are 3,5-diethyl benzene sulphonic acid, p-butyl benzene sulphonic acid, 1,5-diisopropyl naphthalene sulphonic acid, octylbenzene sulphonic acid, decyl benzene sulphonic acid, octadecyl benzene sulphonic acid, di-sec.-butyl naphthalene sulphonic acid, di-n-butyl naphthalene sulphonic acid and their ammonium salts.

The sulphonic acid which is particularly preferred is dodecyl benzene sulphonic acid.

The agent used for rendering the foam hydrophilic should be soluble in the polyhydroxyl compounds used. The agent used to render the foam hydrophilic may be included in the reaction mixture in a quantity of about 2% to about 10% by weight, based on the weight of polyhydroxyl compound used.

The effect of the agent used to increase the hydrophilic character is enhanced by the addition of other surface-active additives to the sulphonic acid in proportions by weight of between 1:10 and 2:1. The surface-active additives used may be any of those commonly used in polyurethane chemistry, e.g. alkyl aryl polyethers or salts or fatty acids and amines such as oleic acid diethylamine or stearic acid diethanolamine. These additives have a synergistic action on the agent specifically used to render the foam hydrophilic.

Any suitable organic polyisocyanates may be used as the starting material in the process according to the invention including aliphatic, cycloaliphatic, araliphatic, aromatic or heterocyclic polyisocyanates such as those described e.g. by W. Siefgen in Justus Liebigs Annalen der Chemie, 562, pages 75 to 136, for example, ethylene diisocyanate; tetramethylene-1,4-diisocyanate; hexamethylene-1, 6-diisocyanate; dodecane-1,12-diisocyanate; cyclobutane-1,3-diisocyanate; cyclohexane-1,3-diisocyanate and cyclohexane-1,4-diisocyanate and any mixtures of these isomers; 1-isocyanato-3,3,5trimethyl-5-isocyanato-methylcyclohexane (German Auslegeschrift No. 1,202,785); hexahydrotolylene-2,4-diisocyanate; hexahydrotolylene-2,6-diisocyanate and any mixtures of these isomers; hexahydrophenylene-1,3-diisocyanate; hexahydrophenylene-1,4-diisocyanate; perhydrodiphenylmethane-2,4'-diisocyanate; perhydrodiphenyl-methane-4,4'-diisocyanate; phenylene-1,3-diisocyanate; phenylene-1,4-diisocyanate; tolylene-2,4-diisocyanate; tolylene-2,6-diisocyanate and any mixtures of these isomers; diphenylmethane-2, 4'-diisocyanate; diphenylmethane-4,4'-diisocyanate; naphthylene -1,5-diisocyanate; triphenylmethane-4,4',4''-triisocyanate; the polyphenyl-polymethylene-polyisocyanates obtained by aniline-formaldehyde condensation followed by phosgenation such as those described e.g. in British Patent Specifications No. 874,430 and 848,671; perchlorinated aryl polyisocyanates as described e.g. in German Auslegeschrift No. 1,157,601; polyisocyanates which contain carbodiimide groups as described in German Specification No. 1,092,007; the diisocyanates described in U.S. Patent Specification No. 3,492,330: polyisocyanates which contain allophanate groups as described e.g. in British Patent Specification No. 994,890, Belgian Patent Specification No. 761,626 and Dutch published Patent Application No. 7,102,524; polyisocyanates which contain isocyanurate groups as described e.g. in German Patent Specification No. 1,022,789; 1,222,067 and 1,027,394 and in German Offenlegungsschriften No. 1,929,034 and 2,004,048; polyisocyanates which contain urethane groups as described e.g. in Belgian Patent Specification No. 752,261 or in U.S. Patent Specification No. 3,394,164; polyisocyanates which contain acylated urea groups according to German Patent Specification No. 1,230,778; polyisocyanates which contain biuret groups as described e.g. in German Patent Specification No. 1,101,394; in British Patent Specification No. 889,050 and in French Patent Specification No. 7,017,514; polyisocyanates prepared by telomerization reactions as described e.g. in Belgian Patent Specification No.723,640; polyisocyanates which contain ester groups such as those mentioned e.g. in British Patent Specifications No. 965,474 and 1,072,956; in U.S. Patent Specifications No. 3,567,763 and in German Patent Specification No. 1,231,688 and reaction products of the above mentioned isocyanates with acetals in accordance with German Patent Specification No. 1,072,385.

The distillation residues obtained from commercial isocyanate production which still contain isocyanate groups may also be used and may be dissolved in one or more of the above mentioned polyisocyanates. Any mixture of the above mentioned polyisocyanates may also be used.

In general, it is particularly preferred to use commercially readily available polyisocyanates such as tolylene-2,4-diisocyanate and tolylene-2,6-diisocyanate and any mixture of these isomers ("TDI"), polyphenyl-polymethylene polyisocyanates obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The mixture of starting components used according to the invention also includes any suitable organic compound which contains at least two hydrogen atoms determinable by the Zerewitinoff method and is capable of reacting with isocyanates. It is preferred that the organic compound have a molecular weight from about 50 to about 10,000. Suitable compounds include not only compounds which contain amino groups, thiol groups or carboxyl groups but also in particular polyhydroxyl compounds and particularly those which contain from two to eight hydroxyl groups, especially those which have a molecular weight of about 50 to about 10,000 and preferably about 1,000 to about 6,000. Examples of such compounds are monomeric polyvalent alcohols, polyesters, polyethers, polythioethers, polyacetals, polycarbonates, and polyester amides, all of which contain at least two and generally 2 to 8 but preferably 2 to 4 hydroxyl groups; compounds of this type are already known per se for the production both of homogeneous and of cellular polyurethanes.

The following are examples of suitable monomeric polyvalent alcohols: ethylene glycol, propylene-1,2-glycol, butane-1,4-diol, hexane-1,6-diol, glycerol, trimethylolpropane, erythritol, pentaerythritol, sorbitol, sucrose and the like.

Any suitable hydroxyl-containing polyester may be used including e.g. the reaction products of polyhydric alcohols, preferably dihydric alcohols to which trihydric alcohols may be added and polybasic, preferably dibasic, carboxylic acids. Instead of the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and may be substituted, e.g. with halogen atoms, and/or unsaturated. Examples of suitable polycarboxylic acids include succinic acid, adipic acid, suberic acid, oxalic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate. Any suitable polyhydric alcohol may be used such as for example ethylene glycol, propylene-1,2-glycol, propylene-1,3-glycol, nutylene-1,4-glycol, nutylene-2,3-glycol, hexane-1,6-diol, octane-1,8diol, neopentyl glycol, cyclohexane dimethanol (1,4-bis-hydroxymethyl cyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, polybutylene glycols, and the like. The polyesters may also contain a proportion of terminal carboxyl groups. Polyesters of lactones such as ε-caprolactone or of hydroxy carboxylic acids such as ω-hydroxycaproic acid may also be used.

Any known suitable polyethers containing at least two, generally two to eight and preferably two or thee hydroxyl groups may be used in practicing the invention such as, for example, polyethers prepared by polymerizing epoxides such as ethylene oxide, propylene oxide, butylene oxide, tetrahydrofuran, styrene oxide or epichlorohydrin, each with itself e.g. in the presence of boron trifluoride or by an addition reaction of these epoxides either as mixtures or successively, with starting components which contain reactive hydrogen atoms such as alcohols or amines, e.g. water, ethylene glycol, propylene-1,3-glycol or propylene-1,2-glycol, trimethylolpropane, 4,4'-dihydroxy-diphenylpropane, aniline, ammonia, ethanolamine, ethylene-diamine, or the like. Sucrose polyethers such as those described e.g. in U.S. Pat. No. 3,153,002, German Auslegeschriften No. 1,176,358 and 1,064,938 may also be used for the process according to the invention. It is frequently preferred to use polyalkylene ethers which contain predominantly primary hydroxyl groups (up to 90% by weight, based on all the hydroxyl groups present in the polyether). Polyethers which are modified with vinyl polymers, e.g. the products obtained by polymerizing styrene or acrylonitrile in the presence of polyethers (U.S. Patent Specification No. 3,383,351; 3,304,273; 3,523,093 and 3,110,695 and German Patent Specification No. 1,152,536) and polybutadienes which contain hydroxyl groups are also suitable.

Any suitable polythioether may be used such as, for example, the condensation products of thiodiglycol with itself and/or with other glycols, dicarboxylic acids, formaldehyde, aminocarboxylic acids or amino alcohols. The products obtained are either polythio mixed ethers, polythioetheresters or polythioetheresteramides, depending upon the co-components used to make them Any suitable polyacetal may be used such as e.g. the compounds which can be prepared from glycols such as diethylene glycol, triethylene glycol, 4,4'-dihydroxyethoxy-diphenyldimethylmethane, hexanediol and formaldehyde. Polyacetals suitable for the process according to the invention may also be prepared by the polymerization of cyclic acetals.

Any suitable polycarbonate with hydroxyl groups may be used such as e.g. those obtained by reacting diols such as propane-1,3-diol, butane-1,4-diol and/or hexane-1,6-diol, diethylene glycol, triethylene glycol or tetraethylene glycol with diaryl carbonates such as diphenyl carbonate or phosgene.

Any suitable polyester amide or polyamide may be used such as, for example, the predominantly linear condensates obtained from polybasic saturated and unsaturated carboxylic acids or their anhydrides and polyvalent saturated and unsaturated amino alcohols, diamines, polyamines, and mixtures thereof.

Polyhydroxyl compounds which already contain urethane or urea groups as well as modified or unmodified natural polyols such as castor oil, carbohydrates or starch may also be used. Addition products of alkylene oxides with phenol-formaldehyde resins or with urea-formaldehyde resins may also be used in the process according to the invention.

Representatives of these types of reactive hydrogen containing compounds and of suitable organic polyisocyanates are described e.g. in High Polymers, Volume XVI, "Polyurethanes, Chemistry and Technology", by Saunders-Frisch, Interscience Publishers, New York, London, Volume I, 1962, pages 32 - 42 and pages 44 -54 and Volume II, 1964, pages 5 -6 and 198 - 199 and in Kunststoff-Handbuch, Volume VII, Vieweg-Hochtlen, Carl-Hanser-Verlag, Munich, 1966, e.g. on pages 45 - 71, the disclosures of which are incorporated herein by reference.

Water and/or any suitable readily volatile organic substance may be used as blowing agents in the process according to the invention. Suitable organic blowing agents are e.g. acetone, ethyl acetate, methanol, ethanol, halogenated alkanes such as methylene chloride, chloroform, ethylidene chloride, vinylidene chloride, monofluorotrichloromethane, chlorodifluoromethane, or dichlorodifluoromethane, butane, hexane, heptane, diethyl ether and the like. A blowing effect can also be obtained by adding compounds which decompose at temperatures above room temperature to liberate gases, e.g. azo compounds such as azoisobutyric acid nitrile which liberate nitrogen. Further examples of blowing agents and details of the use of blowing agents may be found in Kunststoff-Handbuch, Volume VII, published by Vieweg and Hochtlen, Carl-Hanser-Verlag, Munich 1966, e.g. on pages 108 and 109, 453 to 455 and 507 to 510.

Catalysts are also frequently used in the process according to the invention. Any of the catalysts known per se may be used such as e.g. the tertiary amines including triethylamine, tributylamine, N-methyl-morpholine, N-ethyl-morpholine, N-cocomorpholine, N,N,N',N'-tetramethyl-ethylenediamine, 1,4-diazabicyclo-(2,2,2)-octane, N-methyl-N'-dimethyl-aminoethyl- piperazine,N,N-dimethyl benzylamine,bis-(N,N-diethylaminoethyl) -adipate, N,N-diethylbenzylamine, pentamethyl diethylenetriamine, N,N-dimethylcyclohexylamine, N,N,N'-tetramethylbutane-1,3-diamine, N,N-dimethyl-$\beta$-phenylethylamine, 1,2-dimethylimidazole, 2,-methyl-imidazole and the like.

Suitable tertiary amines which contain hydrogen atoms capable of reacting with isocyanate groups may be e.g. triethanolamine, triisopropanolamine, N-methyl-diethanolamine, N-ethyl-diethanolamine, N,N-dimethylethanolamine or their reaction products with alkylene oxides such as propylene oxide and/or ethylene oxide.

Silaamines which contain carbon-silicon bonds may also be used as catalyst, e.g. the compounds described in German Patent Specification No. 1,229,290 such as 2,2,4-trimethyl-2-silamorpholine or 1,3-diethylaminomethyl-tetramethyl-disiloxane.

The catalysts used may also be bases which contain nitrogen such as tetraalkyl ammonium hydroxides or alkali metal hydroxides such as sodium hydroxide, alkali metal phenolates such as sodium phenolate or alkali metal alcoholates such as sodium methylate. Hexahydrotriazines may also be used as catalysts.

Organic metal compounds may also be used as catalysts according to the invention, especially organic tin compounds.

The organic tin compounds used are preferably tin (II) (stannous) salts of carboxylic acids such as tin (II)-acetate, tin(II)-octoate, tin(II)ethylhexoate and tin(II)-laurate and the dialkyl tin salts of carboxylic acids such as dibutyl tin diacetate, dibutyl tin dilaurate, dibutyl tin maleate, dioctyl tin diacetate and the like.

Other examples of catalyst which may be used for the process according to the invention and details of their mode of action are described in Kunststoff-Handbuch, Volume VII, published by Vieweg and Hochtlen, Carl-Hanser-Verlag, Munich 1966, e.g. on pages 96 to 102.

Any catalytic amount of catalyst may be used such as from about 0.001 to 10% by weight, based on the quantity of compounds with a molecular weight of 400 to 10,000 which contain at least two hydrogen atoms capable of reacting with isocyanates.

Surface-active additives (emulsifiers and foam stabilizers) may also be used in the process according to the invention. Suitable emulsifiers are e.g. the sodium salts of ricinoleic sulphonates or of fatty acids or salts of fatty acids with amines such as oleic acid diethylamine or stearic acid diethanolamine.

The foam stabilizers used are mainly water-soluble polyether siloxanes. These compounds are generally built up in such a way that a copolymer of ethylene oxide and propylene oxide is linked to a polydimethyl siloxane group. Foam stabilizers of this type have been described e.g. in U.S. Patent Specification No. 3,201,372, Column 3, line 50 to Column 4, line 5.

Reaction retarders, e.g. acidic substances such as hydrochloric acid or organic acid halides, cell regulators known per se such as paraffins or fatty alcohols or dimethyl polysiloxanes, pigments or dyes and flame-retarding agents known per se, e.g. trischloroethyl phosphate or ammonium phosphate and polyphosphate, age resistors, stabilizers against weathering, plasticizers, fungistatic and bacteriostatic substnaces and fillers such as barium sulphate, kieselguhr, carbon black or whiting may also be used according to the invention.

Suitable macro structuring agents such as stearic acid and/or silicones may also be used to give the foam the appearance of a natural sponge.

Other examples of surface-active additives, foam stabilizers, cell regulators, reaction retarders, stabilizers, flameretarding substances, plasticizers, dyes and fillers and fungistatic and bacteriostatic substances which may also be used in the process according to the invention and details concerning their use and mode of action may be found in Kunststoff-Handbuch, Volume VII, published by Vieweg and Hochtlen, Carl-Hanser-Verlag, Munich 1966, e.g. on pages 103 to 113 and in the above book by Saunders and Frisch.

According to the invention, the reactants are reacted together by the known one-step process, prepolymer process or quasi-prepolymer process, frequently using mechanical devices such as those described in U.S. Patent Specification No. 2,764,565. Details concerning installations and apparatus which may be used for the process according to the invention may be found in Kunststoff-Handbuch, Volume VII, published by Vieweg and Hochtlen, Carl-Hanser-Verleg, Munich 1966, e.g. on pages 121 to 205 and in the Saunders and Frisch book.

The products obtained by the process according to the invention may be used as hydrophilic sponges and, either uncompressed or preferably heat-compressed, they may be used as sponge cloths or wiping cloths. Hydrophilic rigid foams can be used as substrates for cut flower arrangements.

Compression of the foams according to the invention to produce wiping cloths may be carried out e.g. as follows: the foams are cut up into webs 2-50mm, preferably 4-10mm in thickness. The webs are run through a preheating channel, for example a hot air chamber of a channel of infrared radiators and are heated to about 150° to 250° C. After passing through the preheating channel, the foam is passed between two rollers heated to 100° C to 300° C, preferably 180° C t0 250° C, the distance between the rollers being so chosen that the foam is permanently compressed to about 10% to 30% and preferably 20% to 50% of its original thickness. The compression rollers are preferably profiled so that the compressed foam has a surface structure, for example a burled or pitted structure.

EXAMPLES

The parts given are parts by weight. Examples 1 to 4 represent a series of experiments which demonstrates the increase in hydrophilic character of the foams obtained without any deleterious effect on the other properties when the agents according to the invention used to increse the hydrophilic character are added to the reaction mixture.

The polysiloxane stabilizer used in the Examples has the formula

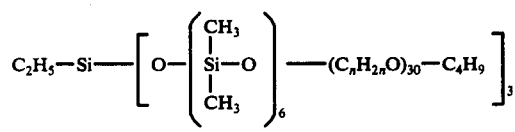

wherein $(C_nH_{2n}O)$ is a mixed polyoxyethylene oxypropylene block copolymer containing about 17 oxyethylene and about 13 oxypropylene units.

| Example | 1 | 2 | 3 |
|---|---|---|---|
| ST FORMULATION | | | |
| Polyester of 7.5 mol of adipic acid, 7.9 mol of diethylene glycol and 0.4 mol of trimethylol propane (OH number 60), parts | 100 | 90 | 90 |
| Dodecyl benzene sulphonic acid, parts | — | 3 | 3 |
| Dodecyl benzene sulphonic acid monoethanolamine parts | — | — | — |
| Dodecyl benzene polyglycol ether (7 glycol ether units), parts | — | — | 0.5 |
| Nonyl benzene polyglycol ether (7 glycol ether units), parts | — | — | — |
| Triethanolamine, parts | 1 | 1 | 1 |
| N,N'-dimethyl benzylamine, parts | 1.5 | 2 | 2 |
| Polysiloxane stabilizer parts | 0.8 | 0.8 | 0.8 |
| Isomeric mixture (2:1) of tolylene-2,4-diisocyanate, tolylene-2,6-diisocyanate, parts | 40 | 40 | 40 |
| Example | 1 | 2 | 3 |
| 2 PHYSICAL PROPERTIES | | | |
| Density (kg/cm³) according to DIN 53420 | 35 | 33 | 34 |
| Tensile strength (kg.wt./cm²) according to DIN 53571 | 1.7 | 1.7 | 1.7 |
| Elongation at break (%) according to DIN 53571 | 270 | 240 | 280 |
| Time required for water absorption of a 10 × 10 × 5 cm block placed on a water surface | 24 hr. | 60 sec | 2-3 sec |

In examples 2 and 3, the same values are obtained for tensile strength and elongation at break in the water saturated state as in the dry state. No swelling is observed.

Examples 4 and 5 demonstrate, in a series of experiments, a similar effect of increased hydrophilic character obtained by the addition of dodecyl benzene sulphonic acid or its monoethanol ammonium salt in the case of a polyurethane foam based on polyhydroxyl polyethers and polyisocyanates.

The foam blocks are dipped in water and wrung out before the wetting time is measured.

| Example | 4 | 5 |
|---|---|---|
| polyether of trimethylolpropane and 70 mol of propylene oxide followed by 15 mol of ethylene oxide (OH-number 35), parts | 70 | 70 |
| Polyether of trimethylolpropane and 30 mols of a propylene oxide/ethylene oxide mixture (ratio 1:1) followed by 40 mol of propylene oxide (OH-number 42), parts | 20 | 20 |
| Polyether of sucrose and propylene oxide (OH-number 600), parts | 10 | 10 |
| Triethanolamine, parts | 3 | 3 |
| Water | 4 | 4 |
| Permethylated ethylaminopiperazine, parts | 0.3 | 0.3 |
| Polysiloxane stabilizer | 0.1 | 0.1 |
| Dodecyl benzene sulphonic acid, parts | — | 3 |
| Dodecyl benzene sulphonic acid monoethanolamine, parts | — | 0.5 |
| Dodecyl benzene polyflycol ether (7 glycol ether units), parts | — | 0.5 |
| Nonyl benzene polyflycol ether (17 glycol ether units), parts | — | — |
| Partly isocyanurized isomeric mixture of tolylene-2,4- and -2,6-diisocyanate (ratio 2:1, NCO content 39%), parts | 50 | 50 |
| Physical PROPERTIES | | |
| Density (kg/m³) according to DIN 53420 | 35 | 35 |
| Tensile strength (kg.wt./cm²) according to DIN 53571 | 0.8 | 0.7 |
| Elongation at break (%) according to DIN 53571 | 130 | 125 |
| Time for complete wetting of a 10 × 10 × 5 cm block placed on a water surface | 5 min. | 2 sec. No swelling is observed in the water-saturated state. |

EXAMPLE 6

A panel of the foam described in Example 2 measuring 30 × +cm by 10 mm in thickness is compressed to a thickness of 4 mm by placing it between two plates heated to 190° C under a pressure of 120 kg.wt./cm² for 120 seconds. A fleece which is suitable for use as wiping cloth is obtained. The tensile strenth is 3.5 kg.wt./cm², the elongation at break 280%. The absorbency of the wiping cloth is measured by dipping strips 2 cm in width vertically into water to a depth of 3 mm. The height to which the water rises is measured after 1 hour. The result obtained in the experiment described is 88 mm.

Any of the other components of a polyurethane reaction mixture indicated as suitable herein for practicing the invention may be substituted for those in the foregoing examples.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a hydrophilic polyurethane foam which comprises reacting an organic polyisocyanate, an organic compound which contains at least two active hydrogen atoms in a mixture containing a blowing agent, the improved process of producing a hydrophilic polyurethane which comprises including in the reaction mixture from about 2 to about 10% by weight based on the weight of said organic compound of an alkyl aryl sulphonic acid which is soluble in said organic compound wherein said alkyl aryl sulphonic acid has the formula $$R_n\text{—Ar—}[\text{—SO}_3\text{H}]_m$$

wherein
Ar represents a $C_6$–$C_{14}$ arylene group,
R represents an alkyl group of 2–20 carbon atoms with the proviso that the total number of carbon atoms of all alkyl groups is from 4 to 40 carbon atoms,
$n$ in an integer of 1 to 4, and
$m$ is an integer from 1 to 3

2. The process of claim 1 wherein the alkyl aryl sulphonic acid is dodecyl benzene sulphonic acid.

3. The process of claim 1 wherein the alkyl aryl sulphonic acid is used in combination with other surface-active additives in a ratio of between 10:1 and 1:2 parts by weight.

4. The product of the process of claim 1.

5. An elastic hydrophilic polyurethane produced by the proces of claim 1.

6. A rigid, hydrophilic polyurethane foam produced by the process of claim 1.

* * * * *